United States Patent [19]

Argy

[11] 4,028,726

[45] June 7, 1977

[54] TV RECEIVER RASTER EXPANSION SYSTEM

[75] Inventor: Thomas W. Argy, Chicago, Ill.

[73] Assignee: Zenith Radio Corporation, Glenview, Ill.

[22] Filed: Jan. 27, 1975

[21] Appl. No.: 544,249

[52] U.S. Cl. .............................. 358/165; 358/180; 315/379

[51] Int. Cl.² ..................... H04N 5/44; H01J 29/70

[58] Field of Search .... 178/7.55 E, 7.5 R, DIG. 29, 178/DIG. 6, 7.5 D; 315/20, 364, 379, 384, 386; 358/180, 165

[56] References Cited

UNITED STATES PATENTS

| | | | |
|---|---|---|---|
| 2,310,671 | 2/1943 | Batchelor | 178/7.5 |
| 2,368,449 | 1/1945 | Cook | 178/7.5 |
| 2,386,728 | 10/1945 | Theisen | 178/7.5 |
| 2,510,670 | 6/1950 | Trott | 178/7.5 R |
| 2,864,969 | 12/1958 | Shulman | 315/386 |
| 3,335,220 | 8/1967 | Wilcox | 178/7.5 |
| 3,740,472 | 6/1973 | Fitzgerald | 178/7.5 |

*Primary Examiner*—John C. Martin
*Attorney, Agent, or Firm*—John R. Garrett

[57] ABSTRACT

A system for enlarging the image on the screen of a cathode ray picture tube by increasing the deflection of the electron beam. Accompanying deterioration in contrast and brightness is reduced by blanking the overscan portions of the raster. In addition, contrast and color level controls are automatically adjusted to match the expanded image to the normal image. The blanking for both the horizontal and vertical deflection is handled by a common circuit.

1 Claim, 3 Drawing Figures

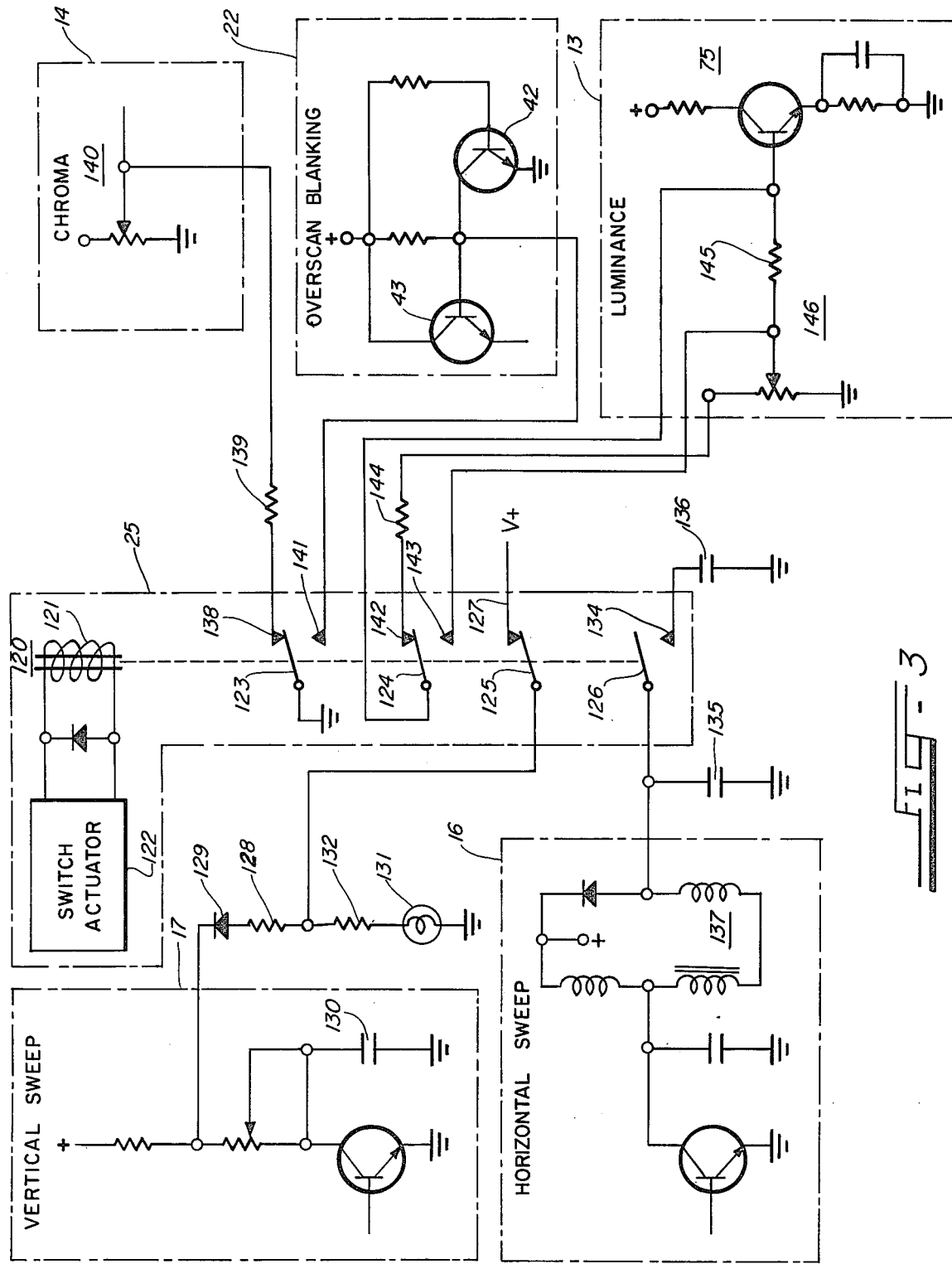

TV RECEIVER RASTER EXPANSION SYSTEM

BACKGROUND OF THE INVENTION

The present invention is directed to providing an improved image raster expanding system for a television receiver.

Prior systems are known in which the central portion of the image may be enlarged by expanding the image raster in one or both directions, and if raster expansion is effected in both directions, it is usually done in such proportions as to maintain the aspect ration unchanged. In the expansion mode the electron beam is deflected beyond the image display screen of the cathode ray picture tube. It is observed that there is a loss of contrast and brightness in the expanded image, that is the picture appears to be washed out. This is annoying to the viewer and requires him to readjust the television receiver. However, it usually is not possible even with readjustment to obtain equivalent picture brightness and contrast. Moreover, in a color television receiver, raster expension usually entails a change in average color level resulting in undesirable color distortion in the enlarged image.

This invention overcomes the serious drawbacks just mentioned by a combination of two importance features. First it has been found that by blanking the electron beam during the interval when the electron beam would be deflected beyond the screen of the cathode ray picture tube, the accompanying deterioration in contrast and brightness levels of the image is greatly reduced. A unique circuit has been devised for providing both horizontal and vertical overscan blanking. Secondly, means are provided for varying the contrast and color level adjustments by an amount sufficient to substantially compensate changes in contrast and color level which accompany raster expansion. In the preferred embodiment, switch means are provided for actuating both the overscan blanking means and the contrast and color level varying means concomitantly with the raster expanding means. However, substantial benefits may be realized by switch-actuating either the overscan blanking means or the contrast and color level varying means alone.

As a result of these advances, a greatly improved image raster expanding system for a television receiver has been achieved. This feature provides a zoom effect by producing a blow up or enlargement of the central portion of the normal image which is substantially as bright and colorful as the original image.

OBJECTS OF THE INVENTION

It is a general object of this invention to provide an improved image raster expanding system for enlarging the central portion of an image on the screen of a television receiver.

It is another object to provide such a system in which the enlarged image substantially matches the normal image in terms of brightness, contrast and color level.

BRIEF DESCRIPTION OF THE DRAWINGS

The features of the present invention which are believed to be novel and unobvious are set forth with particularity in the appended claims. The invention itself, however, together with other objects and advantages thereof, may best be understood by reference to the following description taken in conjunction with the accompanying drawings in which:

FIG. 3 is a schematic diagram showing how a common switch means is employed to provide concomitant operation of the compensating systems with raster expansion in the receiver of FIG. 1.

DESCRIPTION OF THE PREFERRED EMBODIMENT

Figure 1:
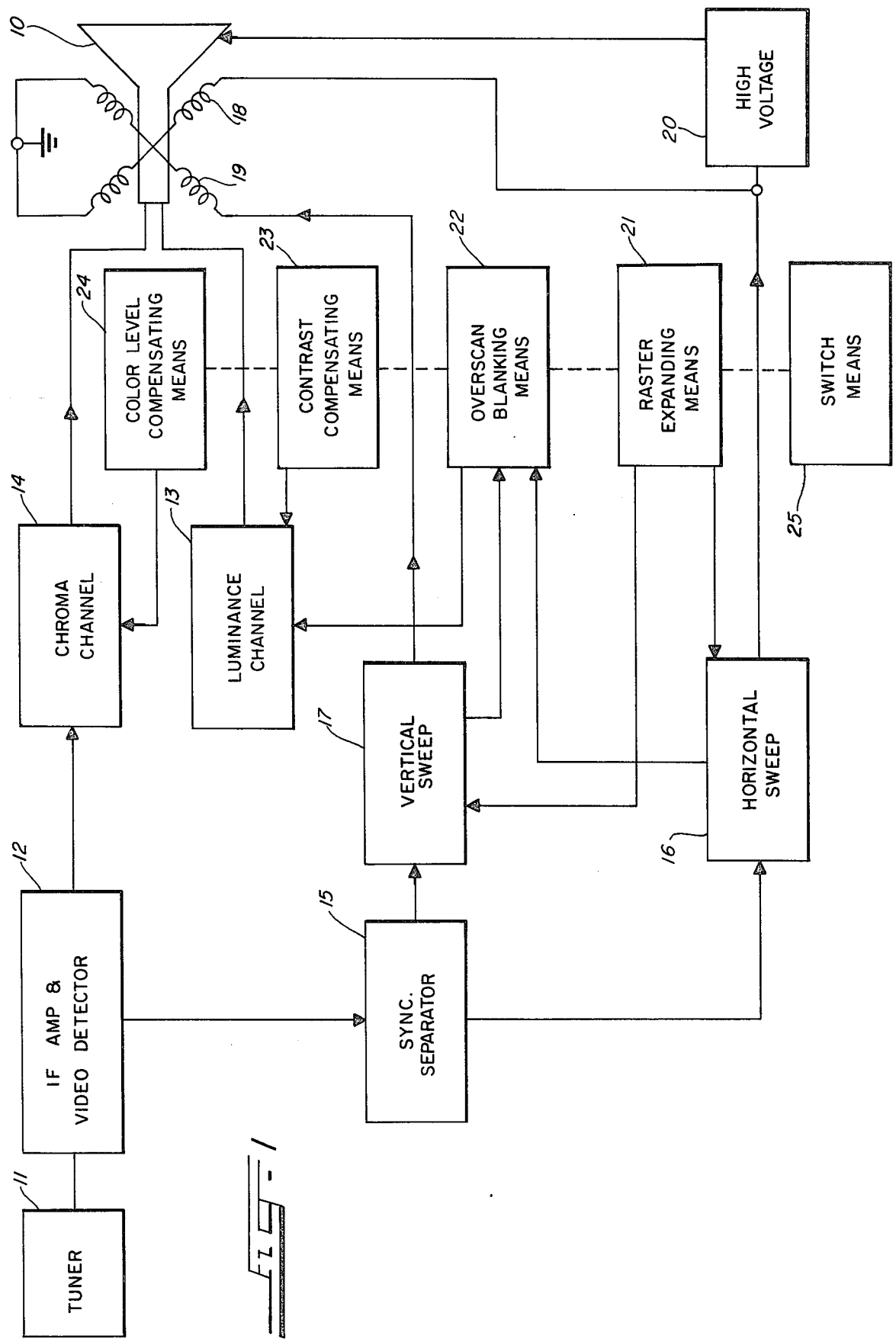
FIG. 1 is a block diagram of a color television receiver constructed in accordance with the present invention.

Referring now to the drawings, a television receiver embodying the present invention comprises a cathode ray picture tube 10 having an image display screen, together with circuitry for processing television signals. This circuitry responds to received television signals including video signal components and horizontal and vertical synchronizing components, to provide for scanning the image display screen with one or more electron beams, a single beam being conventional in monochrome or black-and-white receivers and three electron beams being swept together in present-day commercial color television receivers. An image raster is formed by scanning the screen in a rectangular coordinate pattern having a predetermined aspect ratio. The aspect ratio is the relation of picture width to picture height.

The receiver of FIG. 1 includes a turner 11, an IF amplifier and video detector unit 12, a luminance channel 13 and a chroma channel 14 for receiving and detecting the composite color television signal and intensity modulating the electron beam or beams of picture tube 10 in accordance with the detected luminance and chrominance signal information. Horizontal and vertical synchronizing signals are derived from the detected composite video signal by a sync separator 15 coupled to the video detector of unit 12 and are applied to horizontal and vertical sweep systems 16 and 17 respectively, which develop horizontal and vertical deflection signals for application to respective horizontal and vertical deflection coils 18 and 19 associated with picture tube 10. A high voltage generator 20 coupled to horizontal sweep system 16 develops the required final anode voltage for application to picture tube 10. The receiver also includes a sound detector, amplifier and speaker (not shown) for utilizing the audio signal components of the detected composite video signal.

The receiver shown in FIG. 1 has the capability to expand the central portion of the image raster. This creates what is commonly referred to as a zoom effect. Raster expanding means 21 is coupled to horizontal sweep system 16 and vertical sweep system 17 and is actuatable to enlarge the image raster to approximately 1½ times its normal size, whereupon the central portion of the normal image fills the entire screen and peripheral image portions are in a manner of speaking folded over beyond the edge of the screen. This results because the electron beam is forced to overscan, that is go beyond the screen, causing the electrons to strike the sides of the picture tube. This method of creating a zoom effect is old in the art and while it has been effective in creating a close-up image rendition, the enlarged image is of reduced brightness and contrast, presenting a washed out appearance in color receivers, raster expansion is also accompanied by a reduction in color saturation, i.e., color level of the reproduced image.

In accordance with the present invention, it has been discovered that if the electron beam is turned off or blanked when it is forced to overscan the screen, a dramatic improvement in brightness and contrast occurs. To accomplish this result, overscan interval blanking means 22 actuated from the horizontal and vertical sweep systems 16 and 17 is coupled to luminance channel 13 to blank the electron beam during the overscan intervals corresponding to peripheral image portions. Additional contrast compensating means 23 is preferably coupled to liminance channel 13 to optimize the contrast compensate. If the receiver is a color receiver (as shown), color level compensating means 24 is also provided and coupled to the chroma channel 14 to change the color saturation setting of the receiver by an amount sufficient to offset the reduction in color level which accompanies raster expansion. Finally, in the preferred implementation of the invention, switch means 25 is provided for concomitantly actuating raster expanding means 21, overscan blanking means 22, contrast compensating means 23 and color level compensating means 24. Switch means 25 may in turn be actuated directly from the receiver control panel or by a remote control unit (not shown) as desired.

Figure 2:
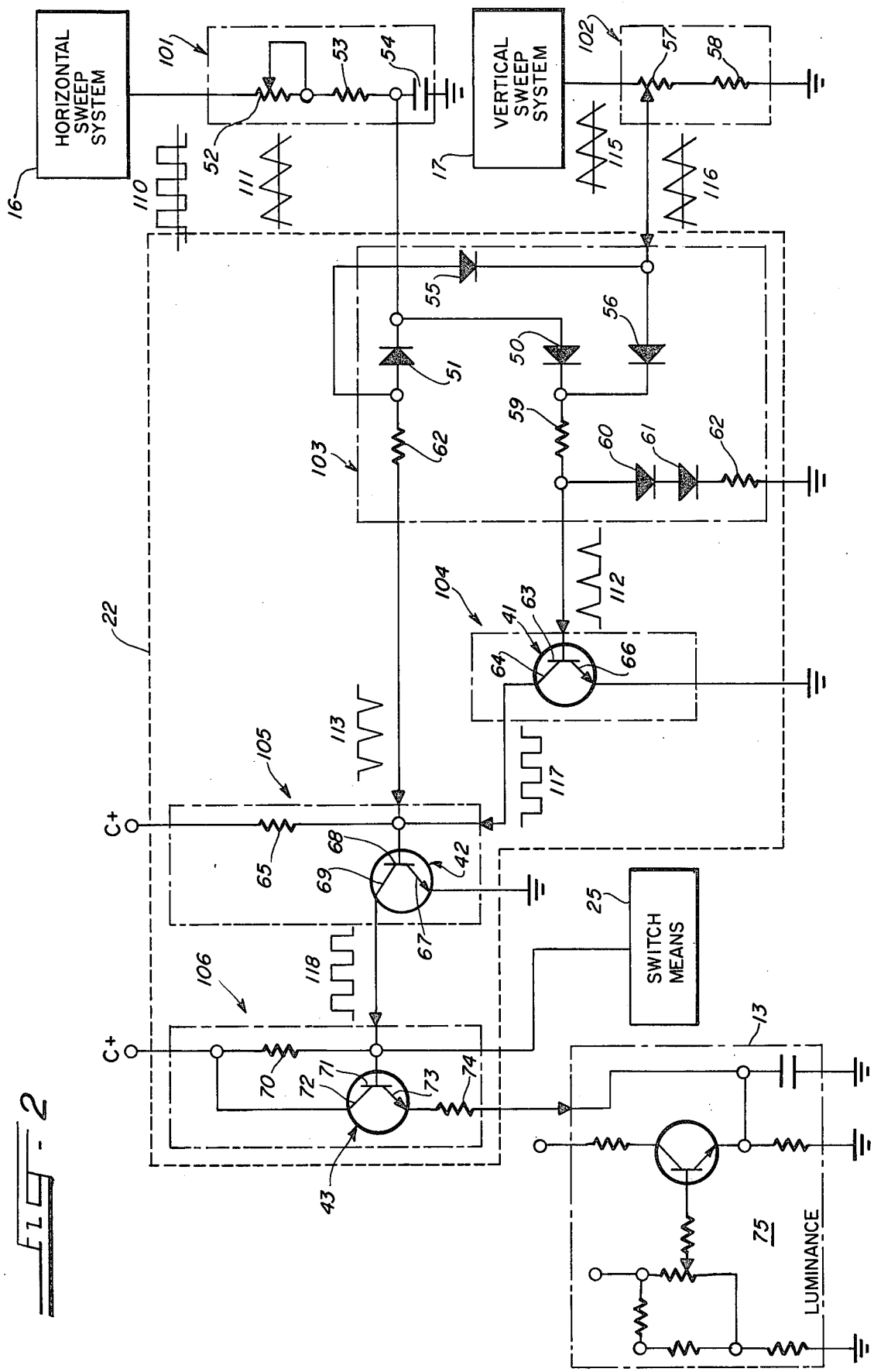
FIG. 2 is a schematic circuit diagram of a preferred overscan blanking circuit for use in the receiver of FIG. 1.

FIG. 2 shows a more detailed diagram of a preferred form of overscan interval blanking means 22. The circuit includes three transistors 41, 42 and 43, all of the NPN type, and comprises an adjustable integrating network 101, an amplitude control circuit 102, diode gate circuitry 103, a modifying state 104, a pulse generating stage 105 and a buffer stage 106.

More particularly, horizontal sweep system 16 is connected to a pair of oppositely poled diodes 50 and 51 by an adjustable resistor 52 in series with a fixed resistor 53. An integrating capacitor 54 is connected from diodes 50 and 51 and from resistor 53 to ground. Vertical sweep system 17 is connected to a second pair of oppositely poled diodes 55 and 56 by a variable resistor 57 which is returned to ground through a fixed resistor 58. Similarly poled diodes 50 and 56 are connected to a resistor 59 which forms a resistive circuit with a pair of series diodes 60 and 61 and a resistor 62. Diodes 55 and 51, which are oppositely poled relative to diodes 50 and 56, are connected to a resistor 62.

The modifying transistor 41 has its base 63 connected to the junction between resistor 59 and diode 50, its collector 64 connected to resistor 62 and to a load resistor 65, which in turn is connected to the positive terminal of a source of unidirectional operating potential C+. The emitter 66 is returned directly to ground.

The pulse generator transistor 42 also has its emitter 67 returned to ground. Its base 68 is connected directly to the collector 64 of modifying transistor 41, and its collector 69 is connected to source C+ by a load resistor 70.

Buffer stage transistor 43 has its base 71 directly connected to the collector 69 of transistor 42 and to switch means 25, and its collector 72 is directly connected to source C+. The emitter 73 is coupled to luminance channel 13 by a series resistor 74. More particularly, resistor 72 is connected to the input circuit of the luminance amplifier 75.

When no signal appears from the horizontal and vertical sweep systems 16 and 17, the base 63 of the modifying transistor 41 is substantially at ground potential. Modifying transistor 41 is in a non-conducting mode and its collector 64 is at the positive voltage established by unidirectional potential source C+. The pulse generator transistor 42 is in a conducting mode and its collector 69 is at ground potential. The buffer stage transistor 43 appears in a standard emitter follower form, and is normally in a non-conducting mode. In addition its base 71 is connected to ground potential through the switch means 25 when the system is not operating in the zoom mode. This insures that no extraneous signals will product an output from the overscan blanking circuit.

When horizontal synchronizing signal components 110 (15.75 kHz) are impressed on the variable integrating network 101, composed of resistors 52 and 53 and capacitor 54, a sawtooth wave 111 is produced at the junction of resistor 53 and capacitor 54. Alternatively, a coil may be provided in series with the yoke for using the current through the horizontal coils of the yoke to produce waveform 111. The diode gate circuitry 103 separates the positive-going portions of the horizontal sawtooth wave 111 (the horizontal synchronizing component) from the negative-going portions. The positive-going portions 112 of the horizontal signal 111 are passed by diode 50 through resistor 59 of resistive divider network 59, 62. The values of resistors 59 and 62 determine the time during which transistor 41 in the modifying stage 104 conducts when the positive-going portion 112 of the horizontal signal appears at its base 63. When this transistor 41 conducts, the voltage at the collector 64 drops to a value near ground potential. In addition to these primarily square pulses 117 on the collector 64, the negative-going portions 113 of the horizontal signal at the junction of resistor 53 and capacitor 54 are passed by diode 51 through resistor 62 to collector 64. This occurs only when transistor 41 is in the nonconducting mode. Therefore, the base 68 of transistor 42 in the pulse generator stage 105 experiences a series of negative-going, square pulses interlaced with triangular pulses.

Each and every one of these pulses (square pulses interlaced with triangular pulses) on base 68 causes pulse generator transistor 42 to stop conducting during a majority of the time the pulses are present. When this occurs, collector 69 rises to approximately the potential of source C+ and base 71 of transistor 43 in the buffer stage 106 experiences a series of substantially square pulses 118 of positive value. Operating as an emitter follower, buffer stage transistor 43 produces this series of line frequency (15.75 kHz) overscan blanking pulses 114 at the terminal of resistor 74.

When the field-frequency (60 Hz) vertical deflection signal components 115 (derived from the vertical synchronizing components) are impressed on variable amplitude-control resistor 57, a reduced amplitude sawtooth wave 116 appears at the junction of diodes 55 and 56. The diode gate circuitry 103 separates the positive-going portions of the vertical signal from the negative-going portions, in a similar manner. The positive-going portions are passed by diode 56 through resistor 59 of resistive divider network 59, 62. The negative-going portions of the vertical signal 116 pass through diode 55 and resistor 62 to the collector 64 of the modifying transistor 41. The rest of the circuit operates in the same manner as previously described for the horizontal signal to produce field-frequency (60 Hz) vertical blanking pulses 114 (like horizontal pulses, but at vertical rate and of longer duration ). In this sense, the pulse generating means has combined the processed horizontal synchronizing signal 110 and the processed vertical deflection signal 115 to develop a composite blanking signal. Both the horizontal signals and vertical signals are thus processed with the same three transistors to form a composite blanking signal for application to luminance channel 13. The horizontal and vertical overscan blanking pulses are employed to cut off luminance amplifier 75 and are adjusted in amplitude and duration by operation of variable resistors 52 and 57 to optimize brightness and contrast in the zoom mode while maintaining full viewing screen utilization.

The following discussion will explain in greater detail the operation of the overscan internal blanking means as already described in general, above. It was previously stated that the horizontal and vertical overscan blanking pulses are adjusted to optimize picture tube brightness and contrast (by blanking those portions of the image which are "beyond" the image screen) by variable resistors 52 and 57 in the overscan internal blanking means 22.

Adjustable intergrating network 101 processes the horizontal synchronizing signal components 110 to produce a sawtooth wave 111. The amplitude of the sawtooth wave 111 is determined by the value of variable resistor 52 in network 101.

Vertical deflection signal components 115 are processed by the amplitude control circuit 102 to produce sawtooth wave 116. By varing resistor 57 in circuit 102 the sawtooth wave 116 is varied in amplitude. Therefore variable resistors 52 and 57 cause amplitude changes in waveforms 111 and 116. The operation of the remainder of the overscan internal blanking means 22 will be described for waveform 111, the operation of the circuit on waveform 116 being identical.

After the diode gate circuit 103 separates the positive-going portion (waveform 112) from the negative-going portion (waveform 113) of waveform 111, the positive-going portion 112 is applied to modifying stage 104. The amplitude of waveform 112 controls the amount of time that transistor 41 in the modifying stage 104 conducts, since changing the amplitude changes the slope of the triangular pulses of waveform 112, thus changing the time at which the voltage on the base 63 of transistor 41 is large enough to cause transistor 41 to conduct. The width of the primarily square pulses 117 is determined by the amount of time that transistor 41 conducts which in turn is determined by the amplitude of waveform 112.

Negative-going square wave 117 turns transistor 42 on and off. Negative-going triangular wave 113 likewise turns transistor 42 on and off; the time that transistor 42 is off being determined by the amplitude of waveform 113. This amplitude is determined by the setting of resistor 52 in the adjustable integrating network 101. Thus, the widths of the square wave pulses of waveform 118 are determined by the amount of time that transistor 42 in the pulse generating stage 104 does not conduct, which in turn is determined by the amplitude of negative-going triangular wave 113 and the amplitude of positive-going waveform 112 as applied to modifying stage 104.

The change in the width of the square wave pulses of waveform 118 alter the amount of blanking at the top and bottom of the image (for the horizontal component) on the television picture tube. Thus it can be seen that this adjustment of the blanking, which in effect blanks the overscan portion of the image, is effected by variable resistor 52. The blanking of the sides of the image is effected in the same manner when the vertical component is applied to the overscan internal blanking means 22.

FIG. 3 shows the manner in which switch means 25 operates to expand the image raster while producing concomitant overscan blanking and color level and contrast compensation. More particularly, switch means 25 comprises a relay 120 with an operating coil 121 adapted to be energized by a switch actuator 122. Switch actuator 122 may be a simple manual switch located on the control panel of the receiver, or it may comprise a remote control system including a wired or wireless portable control unit. Relay 120 comprises four movable contacts 123–126, all of which are illustrated in the actuated or zoom mode.

A fixed contact 138 associated with movable contact 123 is connected through a resistor 139 to the color level potentiometer 140 of chroma channel 14 and movable contact 123 is directly connected to ground. Resistor 139 is thus connected is shunt with the output of color level control 140 when the system is in the zoom mode. Resistor 139 is of a value to reduce the output resistance of color level control 140 just enough to increase color saturation to match that achieved in normal or non-zoom mode operation. A second fixed contact 141 associated with movable contact 123 is connected to base 71 of transistor 43 and to collector 69 of transistor 42 in the overscan blanking circuit to ground these elements and disable the overscan blanking system 22 when the receiver is operated in the normal or non-zoom mode.

Movable contacts 125 and 126 are employed to effect raster expansion upon actuation of relay 120 to the illustrated operating condition. A fixed contact 127 engaged by contact 125 in the zoom mode, is connected to a positive voltage source designated V+. Movable contact 125 is coupled to vertical sweep system 17 through a resistor 128 and a diode 129 to expand the vertical sweep in the zoom mode by increasing the charging time of the vertical sweep storage capacitor 130. An indicating light 131 may also be coupled to movable contact 125 through a voltage dropping resistor 132 if a visual indication of zoom mode operation is desired.

Movable contact 126 and an associated fixed contact 134 are employed to modify the horizontal sweep amplitude for raster expansion. Contacts 126 and 124 are connected to capacitors 135 and 136, respectively, so that both capacitors 135, 136 are connected in parallel to tune the flyback transformer 137 of horizontal sweep system 16 for normal sweep with contact 126 in the lower (non-zoom) position, but capacitor 136 is removed to expand the sweep for zoom mode operation as shown.

A pair of fixed contacts 142 and 143 in association with movable contact 124 are employed to insert a pair of fixed resistors 144 and 145 in circuit with the contrast control potentiometer 146 of luminance amplifier 75 on zoom mode operation. Resistors 144 and 145 are proportional to provide enough contrast enhancement to compensate for any residual contrast reduction not prevented by overscan blanking.

Thus the invention provides an improved monochrome or color television receiver of the type comprising a raster expanding system for zoom mode operation, in which washout of contrast, brightness and color level attendant on zoom mode operation is effectively overcome.

The invention is not limited to the particular details of construction of the depicted embodiment and other modifications and applications are contemplated. Certain changes may be made without departing from the true spirit and scope of the invention as defined by the appended claims.

What is claimed is:

1. In a television receiver of the type comprising a cathode ray picture tube having an image display screen and means responsive to received television signals including video signal components and horizontal vertical synchronizing components for scanning said screen with one or more electron beams in a rectangular coordinate pattern to produce an image raster having a predetermined aspect ratio, the improvement which comprises:

means for expanding said raster in both horizontal and vertical directions, such raster expansion resulting in overscan of said screen by said one or more electron beams during intervals corresponding to peripheral image portions;

overscan interval blanking means responsive to said horizontal synchronizing component and a vertical deflection component internally derived from said vertical synchronizing component, for developing a composite blanking signal to blank said one more electron beams during said overscan interval, said overscan interval blanking means being a common circuit, comprising:

an adjustable integrating network for reshaping said horizontal synchronizing component;

an adjustable amplitude control means for resizing said vertical deflection component;

diode gate circuitry coupled to said adjustable integrating network and said adjustable amplitude control means for partitioning the positive-going portions from the negative-going portions of said reshaped horizontal synchronizing component and said vertical deflection component;

modifying means coupled to said diode gate circuitry for processing said positive-going portions of said reshaped horizontal synchronizing component and said vertical deflection component;

pulse generating means coupled to said modifying means and said diode gate circuitry means for combining said negative-going portions and said processed positive-going portions of said reshaped horizontal synchronizing component and of said vertical deflection component and for combining said processed reshaped horizontal synchronizing component and said processed vertical deflection component; and a buffer stage coupled to said pulse generating means for generating said composite blanking signal; and switch means for concomitantly actuating said raster expanding means and overscan interval blanking means.

* * * * *